July 21, 1959
G. A. CLOWES
2,895,455
VACUUM CONTROL AND MOTOR
Filed April 10, 1958
2 Sheets-Sheet 1
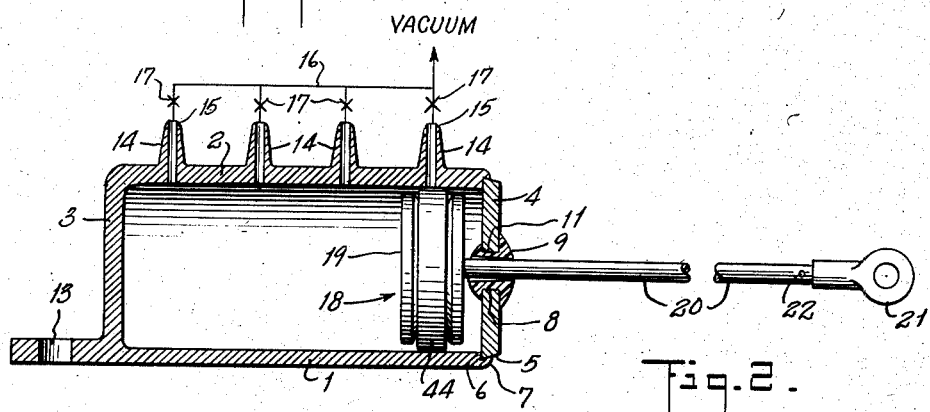
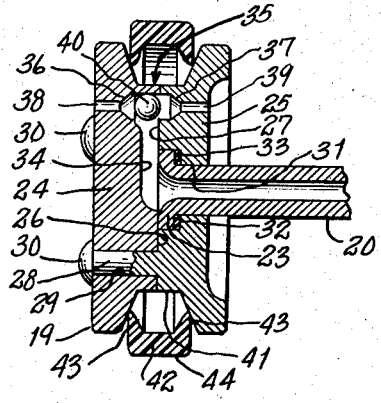
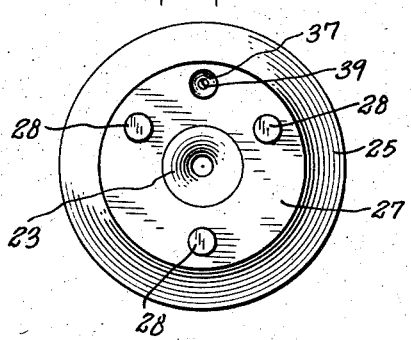
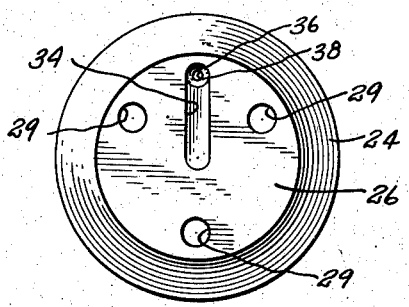
INVENTOR.
GARTH ANTHONY CLOWES
BY
*Kenyon Kenyon*
ATTORNEYS July 21, 1959
G. A. CLOWES
2,895,455
VACUUM CONTROL AND MOTOR
Filed April 10, 1958
2 Sheets-Sheet 2
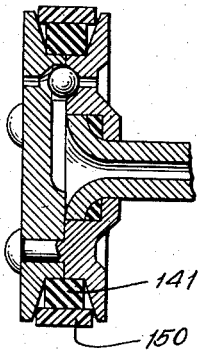
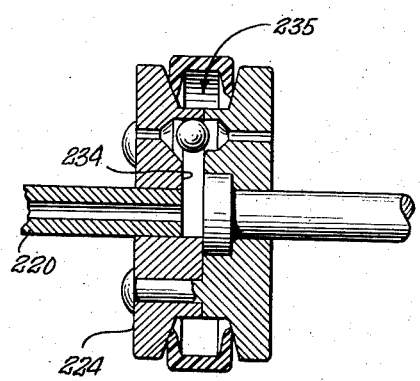
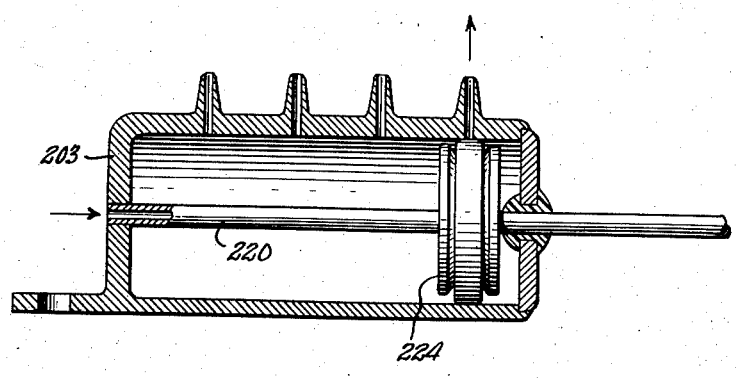
INVENTOR.
GARTH ANTHONY CLOWES
BY
ATTORNEYS

United States Patent Office 2,895,455
Patented July 21, 1959

2,895,455

VACUUM CONTROL AND MOTOR

Garth Anthony Clowes, Kalamazoo, Mich., assignor to Shakespeare Products Company, Kalamazoo, Mich., a corporation of Michigan Application April 10, 1958, Serial No. 727,629

13 Claims. (Cl. 121—41)

This invention relates to control actuators or devices and particularly vacuum operated ones which are particularly well adapted for use in automotive fields for actuating various accessories or other apparatus.

At the present time there is a trend toward the use of vacuum operated actuators or devices in automotive fields and diaphragm motors have been utilized. However, such motors have the disadvantage that they only operate between two positions and cannot be used for three or more positions, as would be required in controlling heating and ventilating accessories or air conditioners or other devices which must be set in more than two positions without using several motors and they are generally costly. Furthermore, coil springs are usually requider to return the mechanism to original position when such motors are employed and the overpowering load will increase as the spring is compressed.

The present invention, however, can be made to control or actuate to a plurality of positions and can be produced quits inexpensively.

It is one of the objects of this invention to provide a vaccum control or actuator that can be moved back and forth between a plurality of and particularly more than two positions for actuating or controlling some apparatus such as an automotive accessory.

Another object is to provide such a control or actuator that can be produced easily and inexpensively.

Another object is to provide such a control or actuator that is positive in its action and which requires a minimum of servicing.

Another object is to provide such a device in the form of cylinder and piston in which the piston has a hollow piston rod and is provided with a unique valve system for introducing air to either side of the piston while sealing off the other side automatically on the application of vacuum to one portion of the cylinder.

Another object is to provide such a device which is self-exhausting. This materially simplifies the distributor valve when several such devices are used, as for instance, when it is desired to operate motors controlling the heater, defroster and the air intake on a car.

Other objects and advantages of the invention will become apparent from the following description of preferred forms of the invention which have been found to be highly satisfactory and which are illustrated in the accompanying drawings, in which:

Fig. 1 is a sectional view through an actuator or control embodying the invention;

Fig. 2 is an end view thereof;

Fig. 3 is a detailed sectional view through the piston head thereof;

Fig. 4 is a plan view of one-half of said piston;

Fig. 5 is a plan view of the other half of said piston;

Fig. 6 is a similar view showing another form of seal for said piston;

Fig. 7 is a sectional view of another form of actuator embodying the invention; and Fig. 8 is a sectional view of the piston head of the device shown in Fig. 7.

The invention consists primarily in a cylinder having a plurality of lateral outlets spaced longitudinally thereon, each connected to a vacuum line and having a control such as a valve so that vacuum can be applied selectively to different parts of the cylinder. Slidably mounted in the cylinder is a piston head having a hollow piston rod having an aperture at its outer end communicating with the atmosphere and having a unique valve construction for controlling the flow of air into the piston through the hollow piston rod.

There is a passage in the interior of the piston leading from the hollow rod to a pair of opposed ports, each opening to one side of the piston. Each port has an inwardly facing conical valve seat and a single ball is disposed between these seats so that when vacuum is applied to one side of the piston head the flow of air will carry the ball to the seat on the side to which the vacuum is applied, thus sealing off that side of the piston and preventing the flow of air into the portion of the cylinder to which the vacuum has been applied. Since the other port is unsealed the air flows to the other side of the piston head and causes the piston to move toward the vacuum.

As the piston head moves along the cylinder it passes over and selectively and successively seals the outlets. Thus, if vacuum is applied at one outlet the piston will move along the cylinder until it slides over and seals that outlet and will thus stop at that outlet. Therefore, it is possible to determine the stopping point by properly selecting the cylinder outlet to which to apply the vacuum.

The piston can be moved in either direction, depending upon where the vacuum is applied, and the valve mechanism performs its function in the same way, namely, by sealing off the side of the piston to which the vacuum is applied and permitting air to flow to the other side of the piston to provide the moving force.

Referring to the drawings and specifically Figs. 1 to 5, the actuator or control comprises a cylinder 1 provided with a cylindrical side wall 2, an integral end wall 3 and an opposed end wall or head 4 provided with a tapered periphery 5 seated on an internal shoulder 6 in the cylinder wall 2 and staked in position by bending the metal 7 of the side wall over the tapered periphery 5 of the head 4.

The head 4 is centrally apertured as at 8 to permit passage of a piston rod and is provided with a seal or packing 9 of the snap-in type having a tapered control aperture for the piston rod and a peripheral groove 11 to fit over the wall or head 4 adjacent the aperture 8.

The cylinder is provided with an ear having an aperture 13 providing a pivot mounting for the cylinder.

The cylinder may be made of any suitable material, such as zinc die casting, and the seal may be made of any suitable material, such as nylon.

Spaced longitudinally along the side wall 2 of the cylinder are a plurality of outlets 14 each opening into the side wall of the cylinder at one end and each having a nipple 15 for the attachment of a vacuum line. The vacuum lines 16 are shown diagrammatically at 1 in Fig. 1 since the details thereof form no part of the invention. A distributor valve may be employed to apply a vacuum to a selected line or a valve 17 may be used for each line for controlling the application of a vacuum to the particular portion of the cylinder into which it opens.

Mounted slidably in the cylinder 2 for longitudinal movement therein is a piston indicated generally at 18 and having a piston head 19 and a piston rod 20 which is slidably fitted in the seal or packing 9.

The piston rod is hollow and may be made of any suitable material, such as steel.

At the outer end of the piston rod is a suitable connecting eyelet 21 and a port 22 for the admission of atmosphere to the hollow interior of the rod. The other end of the piston rod is flared or belled, as is indicated at 23, to facilitate attachment to the piston head 19 and sealing against the passage of air around the outside of the rod 20 into the head 19 when the actuator is in use.

The piston head 19 is made up of a pair of generally disc shaped members 24 and 25 having flat faces 26 and 27, respectively, which fit against one another in airtight relationship. The member 25 is provided with a plurality of integral pins 28 which fit in mating holes 29 in the member 24 and are riveted over, as shown at 30 in Fig. 3.

The member 25 has a central aperture 31 into which the piston rod 20 is fitted. A shoulder 32 is provided as a seat for the flared end 23 of the piston rod 20 and a washer 33 of rubber or other suitable material is provided to seal against the passage of air and to give flexibility to the connection for alignment purposes.

A generally radially disposed air passage leading from the end of hollow piston rod 20 is provided by the groove 34 formed in the face 27 of the member 24. This passage or groove leads radially outwardly to the exhaust valve means indicated generally at 35. It consists of directly opposed conical valve seats 36 and 37 formed in the members 24 and 25, respectively, and each communicating with a port 38 and 39, respectively, opening to opposite sides of the piston head 19. A ball or valve 40 is disposed between the valve seats 36 and 37 and is confined there, being larger in size than the passage 34, or of course, the apertures or ports 38 and 39. The valve seats 36 and 37 are preferably formed so that the ball 40 will not wedge so tightly therein that dislodgement will be difficult. A 90° cone has proven satisfactory.

At the periphery of the piston head 19 is a V-groove 41 and in the form of the invention shown in Fig. 3 an inverted U-shaped packing 42 is employed. The legs 43 of the packing fit in the groove 41 and the connecting bottom 44 of the U fits slidably against the cylinder wall 2. The packing ring is preferably made of Teflon, which is easy sliding and self-lubricating and sufficiently resilient to form an airtight seal.

In operation when vacuum is applied at one of the outlets 14 the rush of air through the hollow piston rod 20 and the passage 34 and through the port 38 or 39, depending upon which side of the piston head the vacuum is applied, will pick up the ball 40 and seat it in the conical valve seat 36 or 37, depending upon which way the air is flowing, and will seal off the side of the piston head on which the vacuum is applied, and the air passing through the other port will force the piston toward the other direction on which the vacuum is applied.

The sealing at the periphery of the piston head is achieved by the pressure of the air inside the U-shaped ring 42, forcing the leg 43 adjacent the vacuum into sealing engagement with the wall of the V groove 41 and forcing the central portion 44 toward the wall 2 of the cylinder.

The piston head moves along the cylinder toward the outlet through which the vacuum is applied and when the ring 42 has covered the outlet the piston stops. The same action occurs on movement in either direction.

Reversal of movement is achieved and the ball 40 is released from the valve seat on which it is seated through leakage of air and because the angle of the conical valve seat is such that wedging is minimized. Each of the valves 17 is a control corresponding to a position of adjustment for the apparatus to be set or adjusted and controls the point of application of the vacuum and the consequent final position of the piston head.

In Fig. 6 is shown another form of packing in which the ring 141 is a simple cylindrical ring with tapered edges backed up by a rubber ring 150.

In Figs. 7 and 8 there is a slight variation in that instead of using the hollow piston rod for the admission of air to the interior of the piston head a flexible tube 220 opening through the integral end wall 203 of the cylinder and through the member 224 and communicates with the radial passage 234 to the valve assembly 235 which is substantially identical with the valve assembly 35.

The present control is particularly desirable for use in situations such as those referred to above where settings at a plurality of positions are desired. It is possible to achieve results not possible with the two-position diaphragm motor and in a more economical way. The positions of the outlets 14 can be placed at any desired interval from one another, thus giving a series of either equal or unequal movement. The terminal outlets may be on the end members if desired for some uses.

In some cases it may be desirable to incorporate a through rod extending from both sides of the piston for giving a double acting effect.

In the foregoing specification, preferred forms of the invention have been described but it will be understood that these are merely illustrative and there is no intention to limit the invention to the specific forms shown.

I claim:

1. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball valve loosely confined between said valve seats adapted to seat selectively on either one and a passage for air leading interiorly of said piston from said hollow piston rod to said valve seat.

2. In a control device the combination of a vacuum cylinder having side and end walls, a plurality of longitudinally spaced lateral outlets each opening through said side wall, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball valve loosely confined between said valve seats adapted to seat selectively on either one and a passage for air leading interiorly of said piston from said hollow piston rod to said valve seat.

3. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing valve seat, a valve loosely confined between said valve seats adapted to seat selectively on either one and a passage for air leading interiorly of said piston from said hollow piston rod to said valve seats.

4. In a control device the combination of a vacuum cylinder having side and end walls, a plurality of longitudinally spaced lateral outlets each opening through said side wall, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing valve seat, a valve loosely confined between said valve seats adapted to seat selectively on either one and a passage for air leading interiorly of said piston from said hollow piston rod to said valve seats.

5. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and adapted to be positioned selectively opposite each of said outlets for sealing the same, a piston-rod fixed to said piston head, opposed ports in opposite sides of said piston each having an inwardly facing conical valve seat, a ball valve loosely confined between said valve seats adapted to seat selectively on either one and a passage for air leading interiorly of said piston to said valve seats and means for admitting air from the exterior of said cylinder to said passage comprising a tube extending between said piston head and an aperture in an end wall of said piston.

6. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball valve loosely confined between said valve seats adapted to seat selectively on either one and a passage for air leading interiorly of said piston from said hollow piston rod to said valve seats and means for admitting air from the exterior of said cylinder to said passage.

7. In a control device the combination of a vacuum cylinder having side and end walls, a plurality of longitudinally spaced lateral outlets each opening through said side wall, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball valve loosely confined between said valve seats adapted to seat selectively on either one and a passage for air leading interiorly of said piston from said hollow piston rod to said valve seats.

8. In a control device the combination of a vacuum cylinder having side and end walls, a plurality of longitudinally spaced lateral outlets each opening through said side wall, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing valve seat, a valve loosely confined between said valve seats adapted to seat selectively on either one and a passage for air leading interiorly of said piston from said hollow piston rod to said valve seats.

9. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and having a peripheral packing groove and an inverted U-shaped peripheral sealing packing fitted in said groove with a central portion in slidable sealing contact with said side wall of said cylinder and adapted to be positioned selectively opposite each of said outlets for sealing the same and having a pair of radially inwardly spaced side walls extending into said groove, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball loosely confined between said conical valve seats adapted to seat selectively on either one and a passage for air leading interiorly of said piston head from the said hollow piston rod to said valve seats.

10. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and adapted to be positioned selectively opposite each of said outlets for sealing the same, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball loosely confined between said conical valve seats adapted to seat selectively on either one and a passage for air leading interiorly of said piston head from the said hollow piston rod to said valve seats.

11. In a control device the combination of a vacuum cylinder having side and end walls, a plurality of longitudinally spaced lateral outlets each opening through said side wall, a piston head fitted in said cylinder for slidable longitudinal movement and having a peripheral packing groove and an inverted U-shaped peripheral sealing packing fitted in said groove with a central portion in slidable sealing contact with said side wall of said cylinder and adapted to be positioned selectively opposite each of said outlets for sealing the same and having a pair of radially inwardly spaced side walls extending into said groove, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball loosely confined between said conical valve seats adapted to seat selectively on either one and a passage for air leading interiorly of said piston head from the said hollow piston rod to said valve seats.

12. In a control device the combination of a vacuum cylinder having side and end walls, a plurality of longitudinally spaced lateral outlets each opening through said side wall and each having a vacuum line connected thereto, means for selectively applying a vacuum to said lines, a piston head fitted in said cylinder for slidable longitudinal movement and having a peripheral packing groove and an inverted U-shaped peripheral sealing packing fitted in said groove with a central portion in slidable sealing contact with said side wall of said cylinder and adapted to be positioned selectively opposite each of said outlets for sealing the same and having a pair of radially inwardly spaced side walls extending into said groove, a piston rod fixed to said piston head, opposed ports in opposite sides of said piston each having an inwardly facing conical valve seat, a ball loosely confined between said conical valve seats adapted to seat selectively on either one and a passage for air leading interiorly of said piston head to said valve seats, and means for admitting air from the exterior of said cylinder to said passage comprising a flexible tube extending between said piston head and an aperture in an end wall of said piston.

13. In a control device the combination of a vacuum cylinder having side and end walls, a piston head fitted in said cylinder for slidable longitudinal movement, a hollow piston rod fixed to said piston head and communicating with the interior thereof and having an aperture positioned outwardly from said cylinder and communicating with the interior of said rod for admission of air from the atmosphere, opposed ports in opposite sides of said piston each having an inwardly facing conical valve seat, a ball valve loosely confined between said valve seats adapted to seat selectively on either one and a passage for air leading interiorly of said piston from said hollow piston rod to said valve seat.

References Cited in the file of this patent

UNITED STATES PATENTS

| | | |
|---|---|---|
| 1,733,502 | Linsley | Oct. 29, 1929 |
| 1,848,464 | Dodge | Mar. 8, 1932 |
| 2,391,578 | Lawrence | Dec. 25, 1945 |
| 2,699,152 | Russell | Jan. 11, 1955 |